(12) United States Patent
Purushothaman et al.

(10) Patent No.: US 11,570,058 B1
(45) Date of Patent: Jan. 31, 2023

(54) AUTO SIMULATION OF CONNECTIVITY CHECKS FROM THE CLIENT SIDE

(71) Applicant: BANK OF AMERICA CORPORATION, Charlotte, NC (US)

(72) Inventors: Sasidhar Purushothaman, Telangana (IN); Mangesh Narendra Chore, Telangana (IN); Rajesh Sen, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/494,313

(22) Filed: Oct. 5, 2021

(51) Int. Cl.
*H04L 41/14* (2022.01)
*H04L 43/12* (2022.01)
*H04L 43/08* (2022.01)

(52) U.S. Cl.
CPC ............ *H04L 41/145* (2013.01); *H04L 43/08* (2013.01); *H04L 43/12* (2013.01)

(58) Field of Classification Search
None
See application file for complete search history.

(56) References Cited

U.S. PATENT DOCUMENTS

| | | | |
|---|---|---|---|
| 9,596,164 B1* | 3/2017 | Kumar | H04L 43/12 |
| 2009/0099827 A1* | 4/2009 | Georgis | H04L 41/145 |
| | | | 703/13 |
| 2011/0087522 A1* | 4/2011 | Beaty | G06Q 10/063 |
| | | | 705/308 |
| 2019/0312910 A1* | 10/2019 | Convertino | G06F 16/254 |
| 2021/0385148 A1* | 12/2021 | Nainar | H04L 43/10 |
| 2022/0029906 A1* | 1/2022 | Mahesh | H04L 41/046 |
| 2022/0141174 A1* | 5/2022 | Yeh | H04L 41/145 |
| | | | 709/206 |
| 2022/0150150 A1* | 5/2022 | Wu | H04L 43/50 |
| 2022/0172084 A1* | 6/2022 | Kaditz | G06F 30/20 |

FOREIGN PATENT DOCUMENTS

WO WO-2014024265 A1 * 2/2014 ......... H04L 63/0428

* cited by examiner

*Primary Examiner* — Uzma Alam
(74) *Attorney, Agent, or Firm* — Moore & Van Allen PLLC; James C. Edwards

(57) ABSTRACT

Auto connectivity simulation from the client-side. Workstations/clients are intelligently selected, on a continuous basis, for auto connectivity simulation and probes are communicated to the selected workstations which activate a previously deployed agent that is configured to conduct connectivity simulations to the communication network and, at least, basic utility services provided within the communication network. The comprehensive results of connectivity simulations are analyzed and patterns of connectivity issues are identified. Subsequently, rules are applied to the patterns of connectivity issues to determine appropriate actions, such as reconfiguring the connectivity route, the servers used for connection and/or notifying personnel assigned to address the issues.

19 Claims, 5 Drawing Sheets

US 11,570,058 B1

AUTO SIMULATION OF CONNECTIVITY CHECKS FROM THE CLIENT SIDE

FIELD OF THE INVENTION

The present invention is generally related to ensuring computing device connectivity to a computing network and services provided therein and, more specifically, on an ongoing basis, intelligently selecting, for connectivity simulation, computing devices that are connectable to a computing network (e.g., intranet) and, in response sending a probe to the selected workstations which activates a pre-existing agent on the workstations to simulate connections to the computing network and services provided within the network.

BACKGROUND

Remote work environments have become common place. Typically, when the remote worker experiences computing problems related to the ability of their computing device, to connect to a computing network (e.g., the employer's intranet or the like) or services offered therein (e.g., email, desktop productivity applications and the like), the remote worker will contact their respective Information Technology (IT) personnel to address the problem. However, in such instances the IT personnel are typically limited to making server-side checks, which may not indicate a problem if, in fact, the issue causing the problem is at the client-side.

Moreover, while systems and method are in place to proactively monitor network and service connectivity/availability at the server-side and address issues arising from such monitoring, no such systems or methods exist to monitor network and service connectivity/availability from the client-side and proactively address issues that would arise from such monitoring (i.e., failure at network segments, routing issues at the client0side and the like).

Therefore, a need exists to develop systems, computer-implemented methods, and the like for monitoring from the client-side network and service connectivity and availability and, proactively addressing issues that result from such monitoring. As a result, the desired systems, computer-implemented methods and the like should resolve problems before they ever become apparent to the users (i.e., remote workers or the like) and, thus, lessen the need for the users to reach out to IT personnel to address an existing network or service connectivity/availability problem.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for auto connectivity simulation from the client-side (i.e., the user/employee workstation-side). Specifically, workstations are intelligently selected, on an ongoing, continuous basis, for auto connectivity simulation and probes are communicated to the selected workstations which activate a previously deployed agent that is configured to conduct connectivity simulations to the communication network (e.g., an intranet) and basic utility services provided within the communication network (e.g., email, business productivity applications and the like). As such, the present invention provides for performance monitoring at the client or workstation-side.

In specific embodiments of the invention, the comprehensive results of connectivity simulations are analyzed and patterns of connectivity issues (e.g., same log entry or the like) are identified. Subsequently, rules are applied to the patterns of connectivity issues to determine appropriate actions, such as auto-reconfiguring the connectivity route, the servers used for connection and/or notifying personnel assigned to address the issues. In this regard, the present invention is able to proactively address connection issues before the user/employee attempts a connection with the network or services provided therein.

In other specific embodiments of the invention, intelligent selection of the workstations is accomplished by forming workstation clusters, which may be based on various factors, such as, but not necessarily limited to, physical location of the workstations, information associated with the workstation users, results of previous connectivity simulations, Internet Service Providers (ISPs) through which the workstations use to connect, requests by system users and the like. Once clusters have been formed, a quantity/number of workstations to be selected for probe deployment is determined. The quantity determination may be based on the criticality of the segment (e.g., the responsibilities of the workstation users in the segment, previous issues associated with the segment and the like). The selection of the workstations may be a random selection or the selection may be based on information associated with the users, previous connectivity simulation results and the like. In this regard, workstations or groups of workstations (i.e., clusters) that have experienced issues that were identified during previous connectivity simulations may have their connectivity simulated more frequently than other workstations or group of workstations. Further, workstations or groups of workstations (i.e., clusters) having users with critical roles/job responsibilities may have their connectivity simulated more frequently than other workstations or groups of workstations.

In additional embodiments of the invention, the probe may define the level of testing and/or the specific testing that is to occur at the workstation. For example, a standard probes may be configured to basic health and welfare (BHW) checks (e.g., OS-level checks of the memory, processing device(s), disk storage and the like), as well as, connectivity simulations to the network (e.g., intranet or the like) and basic predefined utility services (e.g., email, business productivity applications and the like). Alternatively, customized probes may be dynamically configured based information associated with the user, previous results of connectivity simulations and the like. Customized probes may be configured to include all of the testing included in a standard probe, as well as, connectivity simulations of probe-identified other utility services.

A system for verifying connectivity to a computing network and services provided within the computing network defines first embodiments of the invention. The system includes a plurality of workstations configured to connect to the computing network. Each workstation includes a first memory and one or more first processing devices in communication with the memory. The first memory stores an agent that is executable by the first processing device and configured to simulate connectivity to the computing network and services provided within the computing network. The system additionally includes a computing platform in communication with the computing network and including a second memory and one or more second processing devices in communication with the second memory. The second memory stores a module, executable by at least one of the one or more first processing devices and configured to, on an ongoing basis, intelligently select one or more workstations from amongst the plurality of workstations and communicate a probe to the selected one or more workstations. The probe, upon receipt by the one or more workstations, is configured to activate the agent to simulate connectivity to the computing network and one or more of the services provided within the computing network.

In specific embodiments of the system, the module is further configured to, in response to the agents simulating the connectivity, receive results of the simulated connectivity and identify one or more patterns of connectivity issues from the results. In related embodiments of the system, the module is further configured to apply predetermined rules to the patterns of connectivity issues to determine, for each pattern of connectivity issues, an action to be taken to resolve the associated pattern of connectivity issues. In specific embodiments the actions may include, but are not limited to, (i) reconfiguring an actual connection to the computing network or one or more of the services to one or more different servers (i.e., bouncing to a different server or different server bank) and (ii) notifying a predetermined entity of the pattern of connectivity issues.

In other specific embodiments of the system, the module is configured to intelligently select the one or more workstations by (i) determining a plurality workstation clusters for the plurality of workstations, in which each of the plurality of workstations reside in one of the plurality of workstation clusters, (ii) determining, for each of the plurality of workstation clusters, a volume of workstations for probe communication, and (iii) selecting, from each of the plurality of workstation clusters, workstations of the determined volume for probe communication. In such embodiments of the system, determining the plurality workstation clusters may be based on one or more of (i) physical location of the plurality of workstations, (ii) information associated with users of the workstations, (iii) Internet Service Providers (ISPs) of the plurality of workstations, (iv) results of previous connectivity simulations, and (v) requests for specific probing. In other such embodiments of the system, determining, for each of the plurality of workstation clusters, the volume of workstations for probe communication may be based at least on a level of criticality of the workstation cluster. In still further such embodiments of the system, selecting workstations of the determined volume may be based at least on results of previous connectivity simulations.

In additional specific embodiments of the invention, the module is further configured to identify payload information for each of the plurality of workstations. The payload information may be used to configure customized probes, the agents and/or assist in the analysis of connectivity simulations. The payload information may include, but is not limited to, one or more of (i) type of connectivity performed by a workstation, (ii) routing of connectivity performed by the workstation, (iii) information associated with a user of the workstation, (iv) current physical location of the user of the workstation, (v) results of previous connectivity simulations, (vi) Internet Service Provider (ISP) used to connect the workstation to the computing network, (vii) workstations assigned to the user, (viii) existing utilities on the workstation, (ix) user credentials and (x) Application Programming Interface (API) orchestration for deploying probes.

In still further embodiments of the system, the agent is further configured to conduct health checks at the Operating System (OS) level including checks on the memory and the one or more processing devices. In such embodiments of the system, activation of the agent by the probe includes conducting the health checks, along with the connectivity simulations.

Moreover, in additional specific embodiments of the system, the module is configured to generate the probe comprising one of (i) a standard probe configured to activate the agent to perform OS-level health checks, and simulate connectivity to the computing network and to predetermined ones of the services provided within the computing network, and (ii) a customized probe configured to activate the agent to perform OS-level health checks, and simulate connectivity to the computing network, predetermined ones of the services provided within the computing network and to probe-identified ones of the services provided within the computing network.

A computer-implemented method for verifying connectivity to a computing network and services provided within the computing network defines second embodiments of the invention. The computer-implemented method is executed by one or more processing devices. The method includes, on an ongoing basis, intelligently selecting, for connectivity verification, one or more workstations from amongst a plurality of workstations configured for connection to the computing network. The method further includes generating and communicating a probe to the selected one or more workstations. The probe, upon receipt by the one or more workstations, is configured to activate an agent to simulate connectivity to the computing network and one or more of the services provided within the computing network.

In specific embodiments, the computer-implemented method further includes, in response to the agents simulating the connectivity, receiving results of the simulated connectivity and identifying one or more patterns of connectivity issues from the results. Further, the method includes applying predetermined rules to the one or more patterns of connectivity issues to determine, for each pattern of connectivity issues, an action to be taken to resolve the associated pattern of connectivity issues. The action comprises at least one of (i) reconfiguring an actual connection to the computing network or one or more of the services to one or more different servers and (ii) notifying a predetermined entity of the pattern of connectivity issues.

In other specific embodiments of the computer-implemented method, intelligently selecting the one or more workstations further includes (i) determining a plurality workstation clusters for the plurality of workstations, in which each of the plurality of workstations reside in one of the plurality of workstation clusters, (ii) determining, for each of the plurality of workstation clusters, a volume of workstations for probe communication, and (iii) selecting, from each of the plurality of workstation clusters, workstations of the determined volume for probe communication.

In still further specific embodiments of the computer-implemented method, generating and communicating the probe to the selected one or more workstations, further includes generating and communicating the probe selected from the group consisting of (i) a standard probe configured to activate the agent to perform OS-level health checks, and simulate connectivity to the computing network and to predetermined ones of the services provided within the computing network, and (ii) a customized probe configured to activate the agent to perform OS-level health checks, and simulate connectivity to the computing network and to identified ones of the services provided within the computing network.

A computer program product including a non-transitory computer-readable medium defines third embodiments of the invention. The non-transitory computer-readable medium includes a first set of codes for causing a computer to, on an ongoing basis, intelligently select, for connectivity verification, one or more workstations from amongst a plurality of workstations configured for connection to a computing network, In addition, the computer-readable medium includes a second set of codes for causing a computer to generate and communicate a probe to the selected one or more workstations. The probe, upon receipt by the one or more workstations, is configured to activate an agent to simulate connectivity to the computing network and one or more of the services provided within the computing network.

In specific embodiments of the computer program product, the computer-readable medium further includes a third set of codes for causing a computer to, in response to the agents simulating the connectivity, receive results of the simulated connectivity and identify one or more patterns of connectivity issues from the results and a fourth set of codes for causing a computer to, apply predetermined rules to the one or more patterns of connectivity issues to determine, for each pattern of connectivity issues, an action to be taken to resolve the associated pattern of connectivity issues. The action includes at least one of (i) reconfiguring an actual connection to the computing network or one or more of the services to one or more different servers and (ii) notifying a predetermined entity of the pattern of connectivity issues.

In further specific embodiments of the computer program product, the first set of codes are further configured to cause the computer to intelligently select the one or more workstations by (i) determining a plurality workstation clusters for the plurality of workstations, in which each of the plurality of workstations reside in one of the plurality of workstation clusters, (ii) determining, for each of the plurality of workstation clusters, a volume of workstations for probe communication, and (iii) selecting, from each of the plurality of workstation clusters, workstations of the determined volume for probe communication.

Moreover, in further specific embodiments of the computer program product, the second set of codes is further configured to cause the computer to communicate the probe selected from the group consisting of (i) a standard probe configured to activate the agent to perform OS-level health checks, and simulate connectivity to the computing network and to predetermined ones of the services provided within the computing network, and (ii) a customized probe configured to activate the agent to perform OS-level health checks, and simulate connectivity to the computing network and to identified ones of the services provided within the computing network.

Thus, according to embodiments of the invention, which will be discussed in greater detail below, the present invention addresses needs and/or achieves other advantages by providing for auto connectivity simulation from the client-side (i.e., the user/employee workstation-side). Specifically, workstations are intelligently selected, on a continuous basis, for auto connectivity simulation and probes are communicated to the selected workstations which activate a previously deployed agent that is configured to conduct connectivity simulations to the communication network and, at least, basic utility services provided within the communication network. As such, the present invention provides for performance monitoring at the client or workstation-side. Further, the comprehensive results of connectivity simulations are analyzed and patterns of connectivity issues are identified. Subsequently, rules are applied to the patterns of connectivity issues to determine appropriate actions, such as auto-reconfiguring the connectivity route, the servers used for connection and/or notifying personnel assigned to address the issues. In this regard, the present invention is able to proactively address connection issues before the user/employee attempts a connection with the network or services provided therein.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
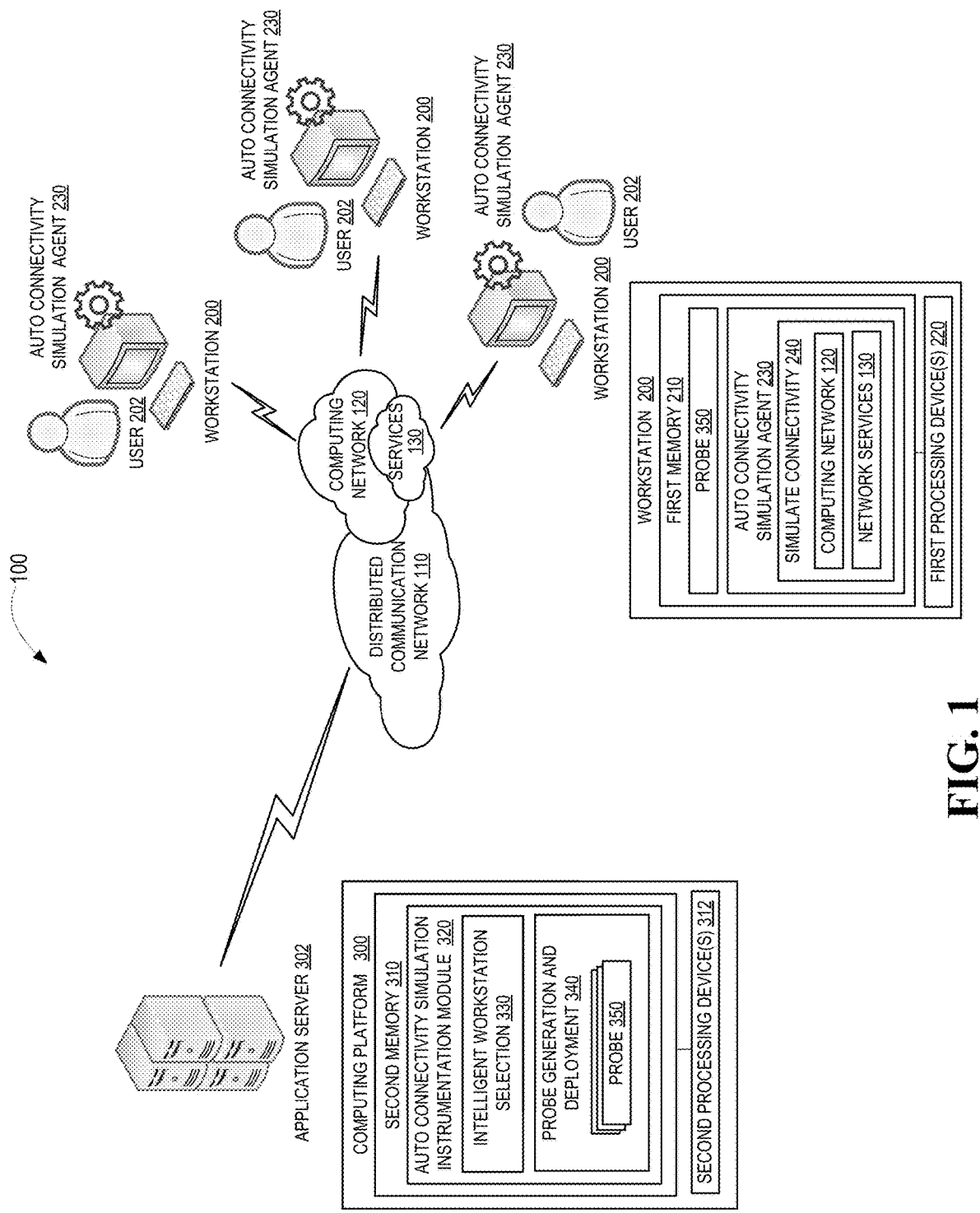
Figure 2:
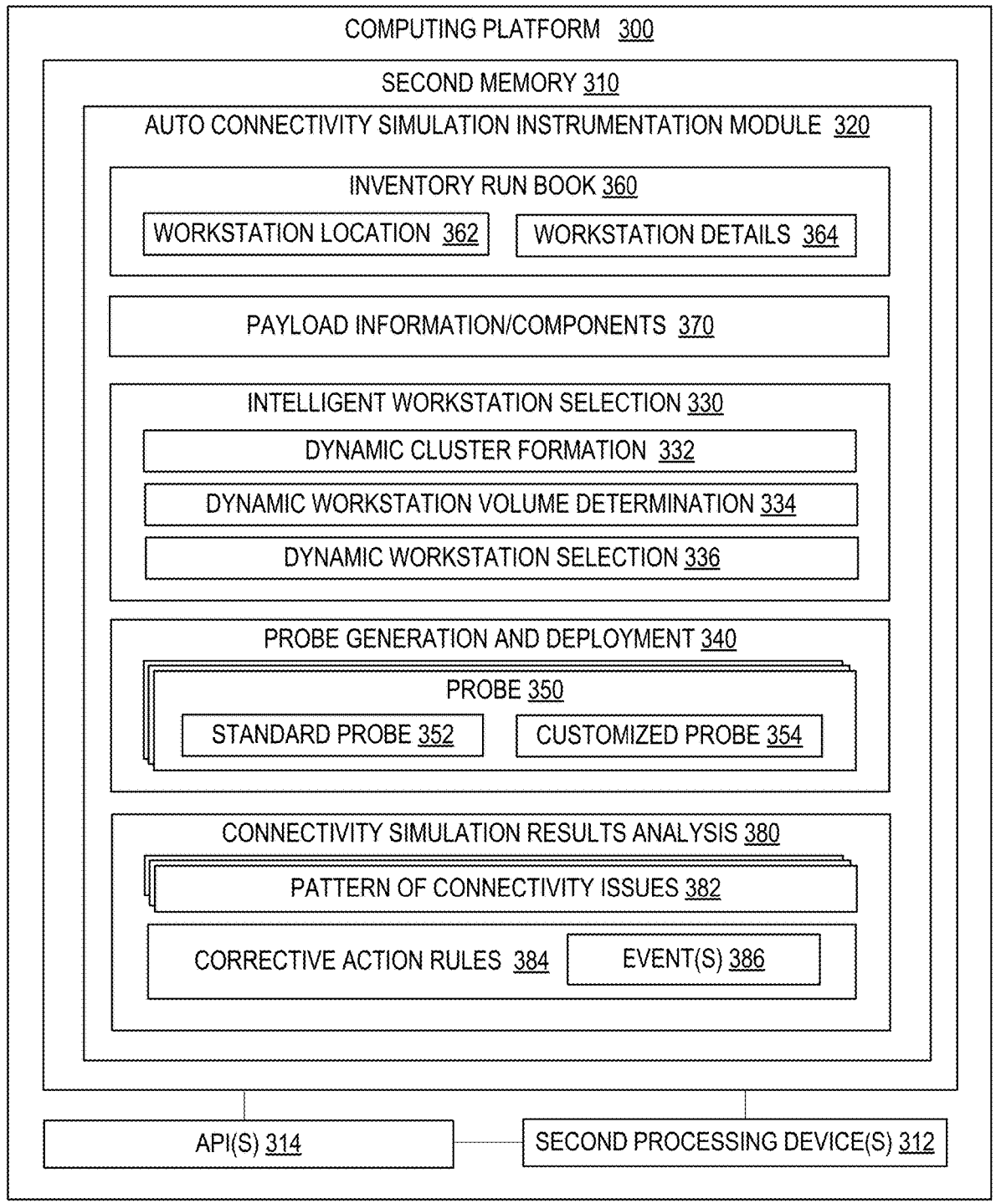
Figure 3:
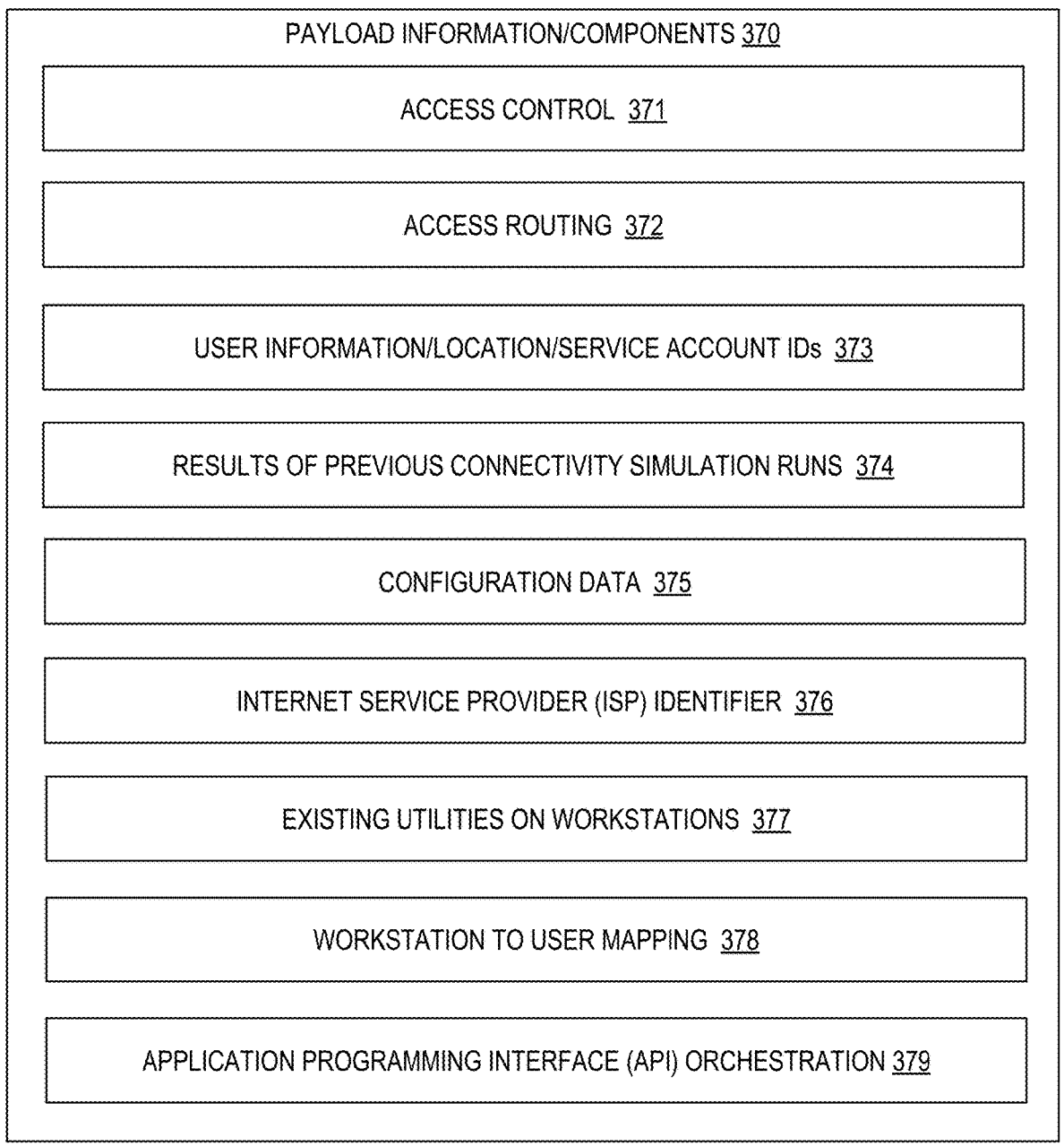
Figure 4:
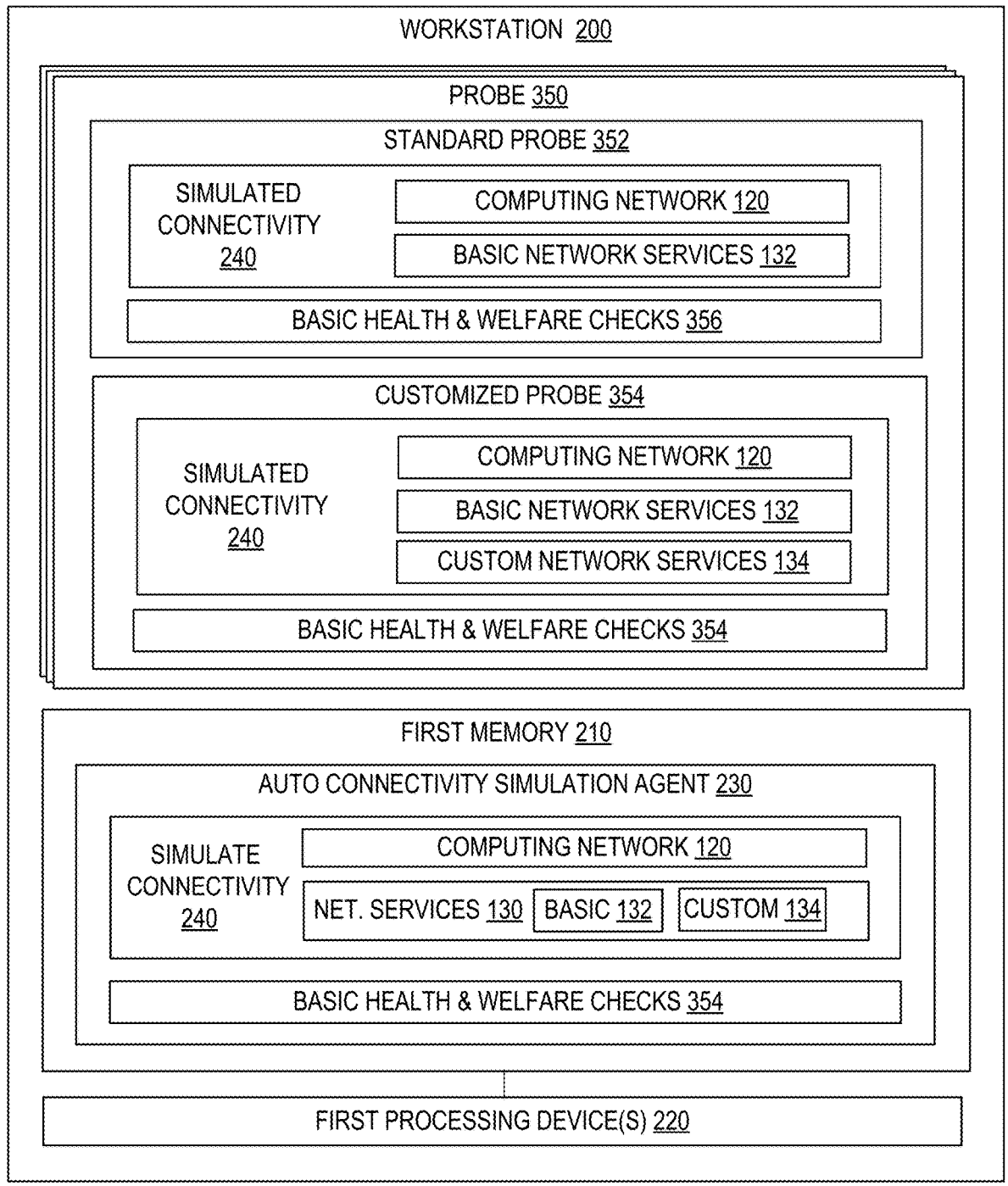
Figure 5:
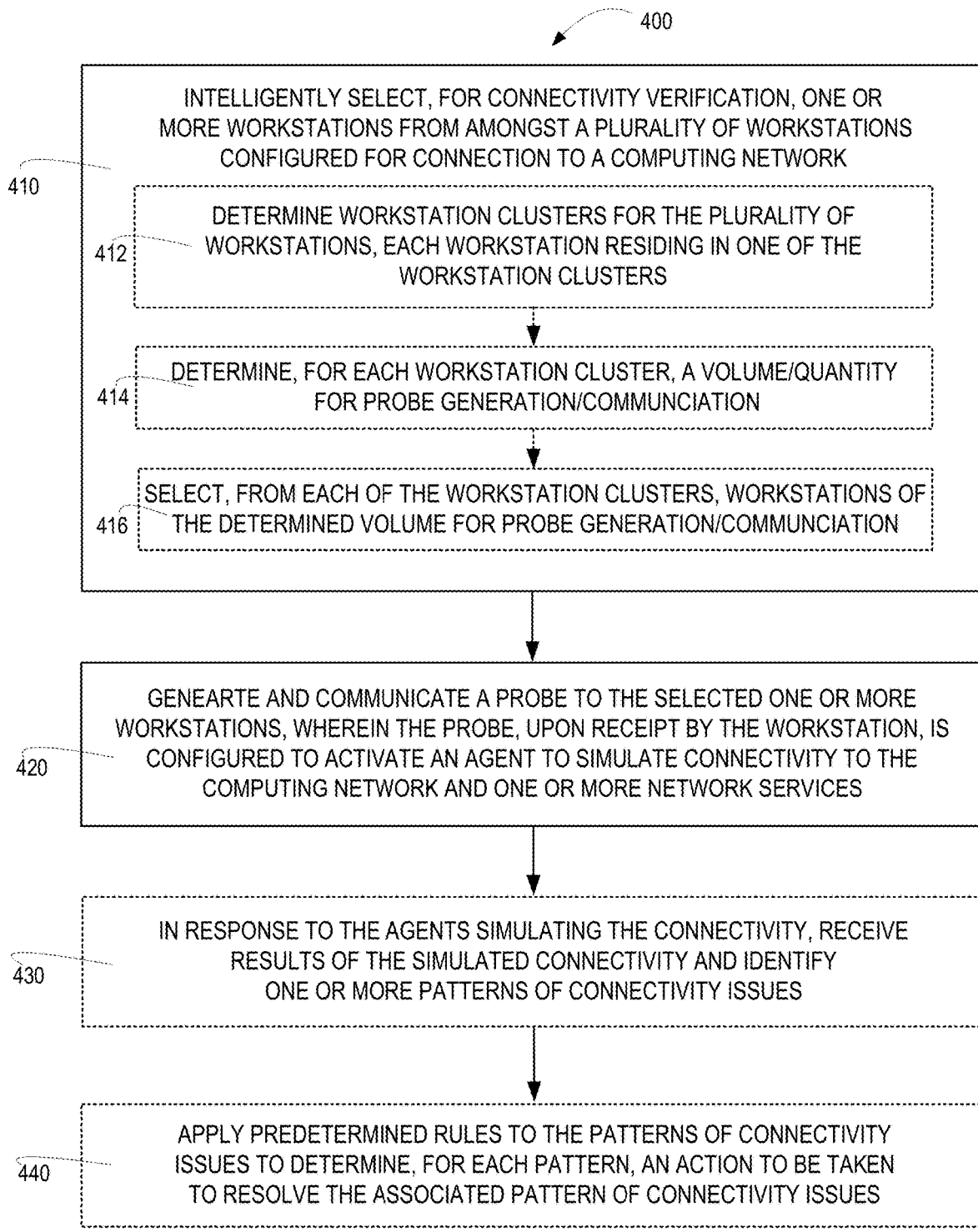

Having thus described embodiments of the disclosure in general terms, reference will now be made to the accompanying drawings, wherein:

FIG. 1 is a schematic/block of a system for providing client-side connectivity simulation for a network and services provided by the network, in accordance with embodiments of the present invention;

FIG. 2 is a block diagram of a computing platform storing an auto connectivity simulation instrumentation module, in accordance with embodiments of the present invention;

FIG. 3 is a block diagram of payload information/components, in accordance with alternate embodiments of the present invention;

FIG. 4 is a block diagram of a workstation storing an auto connectivity simulation agent, in accordance with embodiments of the present invention; and FIG. 5 is a flow diagram of a method for client-side connectivity simulation, connectivity simulation results and auto corrective action, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for auto connectivity simulation from the client-side (i.e., the user/employee workstation-side). Specifically, workstations are intelligently selected, on an ongoing, continuous basis, for auto connectivity simulation and probes are communicated to the selected workstations which activate a previously deployed agent that is configured to conduct connectivity simulations to the communication network (e.g., an intranet) and basic utility services provided within the communication network (e.g., email, business productivity applications and the like). As such, the present invention provides for performance monitoring at the client or workstation-side.

In specific embodiments of the invention, the comprehensive results of connectivity simulations are analyzed and patterns of connectivity issues (e.g., same log entry or the like) are identified. Subsequently, rules are applied to the patterns of connectivity issues to determine appropriate actions, such as auto-reconfiguring the connectivity route, the servers used for connection and/or notifying personnel assigned to address the issues. In this regard, the present invention is able to proactively address connection issues before the user/employee attempts a connection with the network or services provided therein.

In other specific embodiments of the invention, intelligent selection of the workstations is accomplished by forming workstation clusters, which may be based on various factors, such as, but not necessarily limited to, physical location of the workstations, information associated with the workstation users, results of previous connectivity simulations, Internet Service Providers (ISPs) through which the workstations use to connect, requests by system users and the like. Once clusters have been formed, a quantity/number of workstations to be selected for probe deployment is determined. The quantity determination may be based on the criticality of the segment (e.g., the responsibilities of the workstation users in the segment, previous issues associated with the segment and the like). The selection of the workstations may be a random selection or the selection may be based on information associated with the users, previous connectivity simulation results and the like. In this regard, workstations or groups of workstations (i.e., clusters) that have experienced issues that were identified during previous connectivity simulations may have their connectivity simulated more frequently than other workstations or group of workstations. Further, workstations or groups of workstations (i.e., clusters) having users with critical roles/job responsibilities may have their connectivity simulated more frequently than other workstations or groups of workstations.

In additional embodiments of the invention, the probe may define the level of testing and/or the specific testing that is to occur at the workstation. For example, a standard probes may be configured to basic health and welfare (BHW) checks (e.g., OS-level checks of the memory, processing device(s), disk storage and the like), as well as, connectivity simulations to the network (e.g., intranet or the like) and basic predefined utility services (e.g., email, business productivity applications and the like). Alternatively, customized probes may be dynamically configured based information associated with the user, previous results of connectivity simulations and the like. Customized probes may be configured to include all of the testing included in a standard probe, as well as, connectivity simulations of probe-identified other utility services.

Referring to FIG. 1, a schematic/block diagram is presented of a system 100 for providing simulated connectivity at the client-side, in accordance with embodiments of the present invention. The system 100 is implemented within a distributed communication network 110 that may include the Internet, one or more intranets, one or more cellular networks, one or more short-range wireless networks or the like. Specifically, according to embodiments of the present invention, the distributed communication network 110 includes or is otherwise in communication with a computing network 120, which may comprise an intranet, such as an enterprise-wide intranet or the like. Moreover, the computing network 120 provides various different services 130 to a user, such as business applications, including email, business productivity applications, communication applications and the like.

The system includes a plurality of workstations 200, otherwise referred to as "clients" or "user devices", which may include personal computers (PCs) (as shown in FIG. 1), laptops, mobile communication devices, including, but not limited to, smart phones and any other device to which a user 202 connects to the computing network 120. The workstations 200 include a first memory 210 and at least one or more first processing devices 220 that are in communication with the memory 210. First memory 210 stores auto connectivity simulation agent 230 that is configured to simulate connectivity 240 to the computing network 120 and the services 130 provided within the computing network 120. The automated nature of the connectivity simulations means that such connectivity simulations are performed without the user 202 having to perform any overt actions and without the user 202 required to have any knowledge of the occurrence of connectivity simulations.

The system 100 additionally includes a computing platform 300, which may be embodied within an applications server 302 or one or more other computing apparatus. The computing platform 300 is in communication with distributed communication network 110 and computing network 120 and includes second memory 310 and one or more second processing devices 312 that are in communication with second memory 310. Second memory 310 stores auto connectivity simulation instrumentation module 320 that is executable by at least one of the one or more second processing devices 320. The module 320 is configured to, on an ongoing basis, perform intelligent workstation selection 330 to select one, and typically, more workstations 200 from amongst the plurality of workstations 200 for connectivity simulation. Specific embodiments of the intelligent workstation selection 330 process are discussed infra. in relation to FIG. 2. Additionally, module 320 is configured for probe generation and deployment 340 to generate and deploy probes 350 to the selected workstations 200.

In other words, the module 320 performs intelligent workstation selection 330 and probe generation and communication 340 on a continuous basis with each selection process and probe generation/communication referred to as a "run", such that, at any given point in time a certain percentage of the overall corpus of workstations 200 are undergoing connectivity simulation.

In response to the workstation 200 receiving the probe 350, the probe 350 activates the auto connectivity simulation agent 230 to conduct connectivity simulations according to the instructions within the probe 250. At a minimum, as discussed further in relation to FIG. 4, the probe 350 is configured to activate connectivity simulations of the computing network 120 and one or more standard/basis services 130 provided within the computer network. Standard services are network services 130 which all of the users 202 interact with regardless of their role or responsibilities, such as email, basis business productivity applications and the like.

Referring to FIG. 2, a block diagram is presented of a computing platform 300, in accordance with embodiments of the present invention. In addition to highlighting details of the computing platform 300, FIG. 2 describes various alternate embodiments of the invention. Computing platform 300 comprises one or more computing devices/apparatus, such as application servers or the like configured to execute software programs, including instructions, engines, algorithms, modules, routines, applications, tools, and the like. Computing platform 300 includes second memory 310, which may comprise volatile and non-volatile memory, EPROM, EEPROM, or any memory common to computer platforms. Moreover, second memory 310 may comprise cloud storage, such as provided by a cloud storage service and/or a cloud connection service.

Further, computing platform 300 also includes second processing device(s) 312, which may be an application-specific integrated circuit ("ASIC"), or other chipset, logic circuit, or other data processing device. Second processing device(s) 312 may execute an application programming interface ("API") 314 that interfaces with any resident programs, such as connectivity simulation instrumentation module 320 and algorithms, sub-engines/routines associated therewith or the like stored in the second memory 310 of computing platform 300.

Second processing device(s) 312 may include various processing subsystems (not shown in FIG. 2) embodied in hardware, firmware, software, and combinations thereof, that enable the functionality of computing platform 300 and the operability of computing platform 300 on a distributed communication network 110 and/or computing network 120 (shown in FIG. 1). For example, processing subsystems allow for initiating and maintaining communications and exchanging data with other networked devices. For the disclosed aspects, processing subsystems of second processing device(s) 312 may include any subsystem used in conjunction with connectivity simulation instrumentation module 320 and related engines, routines, algorithms, sub-algorithms, modules, sub-modules thereof.

Computing platform 300 additionally includes a communications module (not shown in FIG. 2) embodied in hardware, firmware, software, and combinations thereof, that enables electronic communications between computing platform 300 and other networks and/or networked devices, such as, workstations 200 and computing network 120 and the like. Thus, the communication module may include the requisite hardware, firmware, software and/or combinations thereof for establishing and maintaining a network communication connection with one or more systems, platforms, networks, or the like.

Second memory 310 of computing platform 300 stores auto connectivity simulation instrumentation module 320.

As a precursor to intelligent workstation 330 and probe generation and deployment 340, module 320 is configured to access an inventory run book 360 or other database to identify workstation location 362 and workstation details 364 of the plurality of workstations 200. In addition, module 200 is configured to access various different data sources and the like to obtain various payload information/components 370 that are used in workstation selection 330, probe generation 340 and/or connectivity simulation results analysis 380. Specific payload information/components are discussed in detail, infra. in relation to FIG. 3.

In specific embodiments of the invention, module 320 is configured to perform intelligent workstation selection 330 by conducting dynamic workstation cluster formation 332 in which multiple workstation clusters are formed based on one or more of (i) physical location of the workstations 200, (ii) information associated with the users 202 of the workstations 200, (iii) results of previous connectivity simulations, (iv) Internet Service Providers (ISPs) used by the workstations 200 for connection to the computing network 120 and/or (v) requests for specific probing on certain workstations, types of workstations or workstations that meet predefined criteria. The dynamic nature of the workstation cluster formation 332 means that clusters are formed on a run-by-run basis and, thus, may vary for each workstation selection process.

In further specific embodiments of the invention, module 320 is configured to perform intelligent workstation selection 330 including dynamic workstation volume determination 334, in which the specific number of workstations 200 within a given cluster are determined. The determination of the volume of workstations 200 may be based on a level of criticality of the cluster. Criticality may be defined by previous connectivity issues (i.e., real or simulated) encountered by the workstations in the cluster, the roles/responsibilities of the users 202 of the workstations 200 in the cluster or the like. In other embodiments of the invention, the volume/number of workstations 200 selected from a cluster may be predetermined based on cluster type or the like.

In further specific embodiments of the invention, module 320 is configured to perform intelligent workstation selection 330 by selecting, from each of the clusters, the determined volume/number for probe generation and deployment 340. In specific embodiments of the invention, dynamic workstation selection 336 is based, at least on results of previous connectivity simulations (e.g., workstations experiencing connectivity simulation issues are subjected to more frequent connectivity simulations) and/or information associated with the users (e.g., users with certain roles/responsibilities within an enterprise are subjected to more frequent connectivity simulations) and the like. In other embodiments of the invention, the selection of workstations 200 is conducting entirely random or partially random.

Auto connectivity simulation instrumentation module 320 is further configured to, in response to performing intelligent workstation selection 330, conduct probe generation and deployment 340 to generate and initiate communication of probes 350 to the selected workstations 200. In accordance with specific embodiments of the invention, the probes 350 include standard probes 353, which as previously discussed are configured to simulate connectivity to the computing network 120 and basic network services 130, such as email, business productivity applications (e.g., word processing, spreadsheet, presentation and the like). Additionally, the probes 350 include customized probes 354 that are customized by the module user to include instructions that are configured to not only simulate connectivity to the computing network 130 and the basic network services 130 but also instructions configured to simulate connectivity to workstation-specific network services 130, such as services that are specific to the role/responsibilities of the user 202 of the workstation 200.

Further, auto connectivity simulation instrumentation module 320 is configured to perform connectivity simulation results analysis 380. In specific embodiments of the invention, the analysis 380 includes identifying patterns of connectivity issues 382 (e.g., workstations experiencing connectivity issues with the same server, same server bank, workstations having the same logged connectivity error code(s) or the like). In response to identifying the patterns of connectivity issues 382, analysis 380 further includes applying predetermined a corrective action rules 384 to the pattern 382 to determine one or more corrective action events 386 to perform. The corrective actions events 386 may include a fully automated event for resolving the pattern 382, e.g., rerouting the connections, including rerouting the connections to a different server and/or server bank, resolving issues at the server or server bank and the like. In other embodiments of the invention, the corrective action event 386 may include notifying IT personnel of the pattern, so that the IT personnel can address the issue.

Referring to FIG. 3, a block diagram is depicted of payload information/components 370 that are collected/received by the auto connectivity simulation instrumentation module 320 (shown in FIG. 2). The information/components shown in FIG. 3 are by way of example only and should not be viewed as limiting. As previously discussed, the payload information/components are user to configure probes, selected workstations for probe deployment and assist in the analyzation of results of connectivity simulations. Payload information/components 370 include access control 371 including the per workstation (i) type of access, (ii) region in which the workstation connects and (iii) server(s) the workstation connects to and access routing 372. i.e., how the connectivity request is routed—the optimal route for connectivity. Further, payload information/components 370 include user information/location/service account 373, which includes relevant information pertaining to the users including role(s)/responsibilities and the like, the physical location of the user, the user's service identification/permissions needed to access workstation. The physical location of the user may not be stationary within a region/work location and, thus, determination of the user's location may be based on heuristics or the like.

In addition, payload information/components 370 include results of previous connectivity simulation runs 374. It should be noted that results of more recent runs are provided greater weight in selection of workstations for probe generation/deployment. Additionally, payload information/components 370 include configuration data 375 such as parameters used to define the workstation clusters, select workstations and the like.

Moreover, payload information/components 370 includes ISP identification 376, which is necessary so that the probe can be customized to accommodate the ISP that the workstation is using to connect to the computing network. Further, payload information/components 370 includes identifying existing utilities 377 available on the workstations, as one or more of the existing utilities may be leveraged in the connectivity simulation process. In addition, payload information/components 370 includes a mapping of workstations to users 378, as users may have multiple workstations that they use to connect to the computing network and API orchestration 379 as each probe that is deployed uses multiple application programming interfaces (APIs).

Referring to FIG. 4, a block diagram is presented of a workstation 200, otherwise referred to as a "client" or "user device", in accordance with embodiments of the present invention. In addition to highlighting details of the workstation 200, FIG. 4 describes various alternate embodiments of the invention. As previously noted, workstation 300 comprises one or more computing devices, such PCs, laptops, mobile communication devices or the like configured to execute software programs, including instructions, engines, algorithms, modules, routines, applications, tools, and the like. Workstation 200 includes first memory 210, which may comprise volatile and non-volatile memory, EPROM, EEPROM, or any memory common to computer platforms. First memory 210 may be local memory or external memory that is accessible to workstation 200. Moreover, first memory 210 may comprise cloud storage, such as provided by a cloud storage service and/or a cloud connection service.

Further, workstation 200 also includes first processing device(s) 220, which may be an application-specific integrated circuit ("ASIC"), or other chipset, logic circuit, or other data processing device. First processing device(s) 220 may execute an application programming interface ("API") (not shown in FIG. 4) that interfaces with any resident programs, such as auto connectivity simulation agent 230 and algorithms, sub-engines/routines associated therewith or the like stored in the first memory 210 of workstation 300.

First processing device(s) 220 may include various processing subsystems (not shown in FIG. 4) embodied in hardware, firmware, software, and combinations thereof, that enable the functionality of workstation 200 and the operability of workstation 200 on a distributed communication network 110 and/or computing network 120 (shown in FIG. 1). For example, processing subsystems allow for initiating and maintaining communications and exchanging data with other networked devices. For the disclosed aspects, processing subsystems of first processing device(s) 220 may include any subsystem used in conjunction with auto connectivity simulation agent 230 and related engines, routines, algorithms, sub-algorithms, modules, sub-modules thereof.

Workstation 200 additionally includes a communications module (not shown in FIG. 4) embodied in hardware, firmware, software, and combinations thereof, that enables electronic communications between workstation 200 and other networks and/or networked devices, such as, computing platform 300 and computing network 120 and the like. Thus, the communication module may include the requisite hardware, firmware, software and/or combinations thereof for establishing and maintaining a network communication connection with one or more systems, platforms, networks, or the like.

First memory 210 of computing platform 300 stores auto connectivity simulation agent 230. In response to receiving probe 350, auto connectivity simulation agent 230 is configured to simulate connectivity 240 to the computing network 120 and network services 130 provided by the computing network 120.

As previously discussed, the probe 350 received by the workstation 200 may be a standard/conventional probe 352 that is configured to simulate connectivity 240 to (i) the computing network 120 and (ii) one, and typically, more predefined "basic" network services 132, such as email, business productivity applications and the like. In addition, the standard probe is configured to perform basic health and welfare (BHW) checks 356 at the OS-level, such as checks on the memory capacity, including disk storage utilization, Central Processing Unit (CPU) utilization, and the like. Alternatively, the probe 350 may be a dynamically configured customized probe 354 that is configured to simulate connectivity 240 to (i) the computing network 120, (ii) one, and typically, more predefined "basic" network services 132, such as email, business productivity applications, and (iii) one or more custom network services 134 identified within the probe the like. Connectivity simulation may be required of network services 130, such as applications required by users based on role/responsibilities and these network services are deemed to be custom network services 134 at the probe-level. In addition, the custom probe is configured to perform basic health and welfare (BHW) checks 356 at the OS-level, such as checks on the memory capacity, including disk storage utilization, Central Processing Unit (CPU) utilization, and the like.

Thus, auto connectivity simulation agent 230 is configured to simulate connectivity 240 to the computing network 120, the basic network services 132 and, in some embodiments of the invention, in the event the probe 350 is a customized probe 354, customized network service(s) 354. In addition, the agent 230 or some other application executing on workstation 200 is configured to perform the BHW checks 254 on the workstation.

Referring to FIG. 5, a flow diagram is depicted of a method 400 for providing client-side connectivity simulations, in accordance with embodiments of the present invention. At Event 410, one or more workstations are intelligently selected, for connectivity simulation/verification, from amongst a plurality of workstations that are configured for connection to a computing network. For example, the workstations may be a corpus of workstations within an enterprise that are connectable to the enterprise's computing network (e.g., intranet or the like). The workstations are selected on an on-going basis, with each selection process initiating what is referred to as a "run" of the connectivity simulation process.

In specific embodiments of the method, the intelligent workstation selection process includes, at Event 412, determining workstations clusters for the plurality of workstations, with each workstation residing in one or more of the determined clusters. Clusters may be formed based in one or more of (i) physical location of the workstations, (ii) information associated with the users of the workstations, (iii) results of previous connectivity simulations, (iv) ISPs used by the workstations to connect to the computing network, (v) requests for connectivity checks provided by IT personnel and the like. In further specific embodiments of the method, at Event 414, for each workstation station, a volume/quantity of workstations is dynamically determined for probe generation/deployment. The volume/quantity may be based on the criticality level of the workstation cluster, with criticality based at least on the results of previous connectivity simulations and/or information associated with the users of the workstations. In other embodiments of the method, the volume/quantity of workstations may be predetermined and/or consistent across all workstation clusters.

In additional specific embodiments of the method, at Event 416, workstations of the determined volume/quantity are selected from each of the workstation clusters for probe generation/deployment. The selection may be random, while in other embodiments of the method, the selection may be based at least on results of previous connectivity simulations and/or information associated with users of the workstations.

At Event 420, the probes are generated and deployed/communicated to the selected one or more workstations. As previous discussed the probe may be a standard probe configured to conduct BHW checks and simulate connectivity with the computing network and basic services provided therein or the probe may be a custom probe configured to perform the same checks and connectivity simulations of a basic probe, along with one or more custom service connectivity simulations associated with a service that is relevant to the user of the workstation. In response to the workstation receiving the probe, an agent is activated on the workstation that is configured to simulate connectivity to at least the computing network and basis services provided by the computing network.

In response to agents simulating the connectivity checks, at optional Event 430, results are received and analyzed to identify one or more patterns of connectivity issues (e.g., connectivity issues at the same server and/or server bank, same logged error code(s) or the like). At optional Event 6640, predetermined rules are applied to the pattern(s) of connectivity issues to determine, for each pattern of connectivity issues, at least one action to be taken to resolve the pattern. The action may be an automated action, such as, but not limited to, reconfiguring the routing of the connectivity, bouncing the connection to a new server or server bank or the like. Alternatively, the action may include notifying appropriate IP personnel so that they can investigate and resolve the issue(s).

Thus, as described in detail above, present embodiments of the invention include systems, methods, computer program products and/or the like for auto connectivity simulation from the client-side (i.e., the user/employee workstation-side). Specifically, workstations are intelligently selected, on a continuous basis, for auto connectivity simulation and probes are communicated to the selected workstations which activate a previously deployed agent that is configured to conduct connectivity simulations to the communication network and, at least, basic utility services provided within the communication network. As such, the present invention provides for performance monitoring at the client or workstation-side. Further, the comprehensive results of connectivity simulations are analyzed and patterns of connectivity issues are identified. Subsequently, rules are applied to the patterns of connectivity issues to determine appropriate actions, such as auto-reconfiguring the connectivity route, the servers used for connection and/or notifying personnel assigned to address the issues. In this regard, the present invention is able to proactively address connection issues before the user/employee attempts a connection with the network or services provided therein.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for verifying connectivity to a computing network and services provided within the computing network, the system comprising;
    a plurality of workstations configured to connect to the computing network, wherein each workstation comprises a first memory and one or more first processing devices in communication with the first memory, wherein the first memory stores an agent, executable by at least one of the one or more first processing devices and configured to simulate connectivity to the computing network and services provided within the computing network;
    a computing platform in communication with the computing network and comprising a second memory and one or more second processing devices in communication with the memory, wherein the second memory stores a module, executable by at least one of the one or more second processing devices and configured to:
        on an ongoing basis, intelligently select workstations from amongst the plurality of workstations,
        generate and communicate a probe to the selected multiple workstations, wherein the probe, upon receipt by the multiple workstations, is configured to activate the agent to simulate connectivity to the computing network and one or more of the services provided within the computing network, and
        in response to the agents simulating the connectivity, receive, from the multiple workstations, results of the simulated connectivity and identify one or more patterns of connectivity issues from the results, wherein a pattern of connectivity issues is defined as a similarity in connectivity issues across two or more of the workstations.

2. The system of claim 1, wherein the module is further configured to apply predetermined rules to the one or more patterns of connectivity issues to determine, for each pattern of connectivity issues, an action to be taken to resolve a corresponding pattern of connectivity issues.

3. The system of claim 2, wherein the action comprises at least one of (i) reconfiguring an actual connection to the computing network or one or more of the services to one or more different servers and (ii) notifying a predetermined entity of the pattern of connectivity issues.

4. The system of claim 1, wherein the module is configured to intelligently select the multiple workstations by:
    determining a plurality workstation clusters for the plurality of workstations, wherein each of the plurality of workstations reside in one of the plurality of workstation clusters,
    determining, for each of the plurality of workstation clusters, a volume of workstations for probe generation and communication, and
    selecting, from each of the plurality of workstation clusters, workstations of the determined volume for probe generation and communication.

5. The system of 4, wherein the module is configured to intelligently select the multiple workstations by determining the plurality workstation clusters based on one or more of (i) physical location of the plurality of workstations, (ii) information associated with users of the workstations, (iii) Internet Service Providers (ISPs) of the plurality of workstations, (iv) results of previous connectivity simulations, and (v) requests for specific probing.

6. The system of claim 4, wherein the module is configured to intelligently select the multiple workstations by determining, for each of the plurality of workstation clusters, the volume of workstations for probe generation and communication based at least on a level of criticality of the workstation cluster.

7. The system of claim 4, wherein the module is configured to intelligently select the multiple workstations by selecting workstations of the determined volume based at least on results of previous connectivity simulations.

8. The system of claim 1, wherein the module is further configured to identify payload information for each of the plurality of workstations.

9. The system of claim 8, wherein the module is further configured to identify the payload information including one or more of (i) type of connectivity performed by a workstation, (ii) routing of connectivity performed by the workstation, (iii) information associated with a user of the workstation, (iv) current physical location of the user of the workstation, (v) results of previous connectivity simulations, (vi) Internet Service Provider (ISP) used to connect the workstation to the computing network, (vii) workstations assigned to the user, (viii) existing utilities on the workstation, (ix) user credentials and (x) Application Programming Interface (API) orchestration for deploying probes.

10. The system of claim 1, wherein the agent is further configured to conduct health checks at the Operating System (OS) level including checks on the memory and the one or more processing devices, wherein activation of the agent by the probe includes conducting the health checks.

11. The system of claim 1, wherein the module is configured to generate and communicate the probe to the selected multiple workstations, wherein the probe is one of (i) a standard probe configured to activate the agent to perform OS-level health checks, and simulate connectivity to the computing network and to predetermined ones of the services provided within the computing network, and (ii) a customized probe configured to activate the agent to perform OS-level health checks, and simulate connectivity to the computing network and to identified ones of the services provided within the computing network.

12. A computer-implemented method for verifying connectivity to a computing network and services provided within the computing network, the computer-implemented method is executed by one or more processing devices and comprising:
   on an ongoing basis, intelligently selecting, for connectivity verification, multiple workstations from amongst a plurality of workstations configured for connection to the computing network;
   generating and communicating a probe to the selected multiple workstations, wherein the probe, upon receipt by the multiple workstations, is configured to activate an agent stored on each of the multiple workstations to simulate connectivity to the computing network and one or more of the services provided within the computing network; and
   in response to the agents simulating the connectivity, receive, from the multiple workstations, results of the simulated connectivity and identify one or more patterns of connectivity issues from the results, wherein a pattern of connectivity issues is defined as a similarity in connectivity issues across two or more of the workstations.

13. The computer-implemented method of claim 12, further comprising:
   applying predetermined rules to the one or more patterns of connectivity issues to determine, for each pattern of connectivity issues, an action to be taken to resolve a corresponding pattern of connectivity issues, wherein the action comprises at least one of (i) reconfiguring an actual connection to the computing network or one or more of the services to one or more different servers and (ii) notifying a predetermined entity of the pattern of connectivity issues.

14. The computer-implemented method of claim 12, wherein intelligently selecting the multiple workstations further comprises:
   determining a plurality workstation clusters for the plurality of workstations, wherein each of the plurality of workstations reside in one of the plurality of workstation clusters;
   determining, for each of the plurality of workstation clusters, a volume of workstations for probe generation and communication; and
   selecting, from each of the plurality of workstation clusters, workstations of the determined volume for probe generation and communication.

15. The computer-implemented method of claim 12, wherein generating and communicating the probe to the selected multiple workstations, further comprises generating and communicating the probe selected from the group consisting of (i) a standard probe configured to activate the agent to perform OS-level health checks, and simulate connectivity to the computing network and to predetermined ones of the services provided within the computing network, and (ii) a customized probe configured to activate the agent to perform OS-level health checks, and simulate connectivity to the computing network, predetermined ones of the services provided within the computing network and to probe-identified ones of the services provided within the computing network.

16. A computer program product including a non-transitory computer-readable medium, the non-transitory computer-readable medium comprising:
   a first set of codes for causing a computer to, on an ongoing basis, intelligently select, for connectivity verification, multiple workstations from amongst a plurality of workstations configured for connection to a computing network;
   a second set of codes for causing a computer to generate and communicate a probe to the selected multiple workstations, wherein the probe, upon receipt by the multiple workstations, is configured to activate an agent stored on each of the multiple workstations to simulate connectivity to the computing network and one or more of the services provided within the computing network; and
   a third set of codes for causing a computer to, in response to the agents simulating the connectivity, receive, from the multiple workstations, results of the simulated connectivity and identify one or more patterns of connectivity issues from the results, wherein a pattern of connectivity issues is defined as a similarity in connectivity issues across two or more of the workstations.

17. The computer program product of claim 16, further comprising:
   a fourth set of codes for causing a computer to, apply predetermined rules to the one or more patterns of connectivity issues to determine, for each pattern of connectivity issues, an action to be taken to resolve a corresponding pattern of connectivity issues, wherein the action comprises at least one of (i) reconfiguring an actual connection to the computing network or one or more of the services to one or more different servers and (ii) notifying a predetermined entity of the pattern of connectivity issues.

18. The computer program product of claim 16, wherein the first set of codes are further configured to cause the computer to intelligently select the multiple workstations by (i) determining a plurality workstation clusters for the plurality of workstations, wherein each of the plurality of workstations reside in one of the plurality of workstation clusters, (ii) determining, for each of the plurality of workstation clusters, a volume of workstations for probe generation and communication, and (iii) selecting, from each of the plurality of workstation clusters, workstations of the determined volume for probe generation and communication.

19. The computer program product of claim 16, wherein the second set of codes is further configured to cause the computer to generate and communicate the probe selected from the group consisting of (i) a standard probe configured to activate the agent to perform OS-level health checks, and simulate connectivity to the computing network and to predetermined ones of the services provided within the computing network, and (ii) a customized probe configured to activate the agent to perform OS-level health checks, and simulate connectivity to the computing network and to identified ones of the services provided within the computing network.

\* \* \* \* \*